US012770962B2

(12) United States Patent
Abe et al.

(10) Patent No.: US 12,770,962 B2
(45) Date of Patent: Oct. 20, 2026

(54) SHEET FOR FOLDING BATTERIES, FOLDING BATTERY, AND METHOD FOR PRODUCING FOLDING BATTERY

(71) Applicant: TOHOKU UNIVERSITY, Sendai (JP)

(72) Inventors: Hiroya Abe, Sendai (JP); Hiroshi Yabu, Sendai (JP); Koju Ito, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 465 days.

(21) Appl. No.: 18/573,500

(22) PCT Filed: Mar. 7, 2022

(86) PCT No.: PCT/JP2022/009650
§ 371 (c)(1),
(2) Date: Dec. 22, 2023

(87) PCT Pub. No.: WO2023/276283
PCT Pub. Date: Jan. 5, 2023

(65) Prior Publication Data

US 2024/0372182 A1 Nov. 7, 2024

(30) Foreign Application Priority Data

Jun. 29, 2021 (JP) ................................. 2021-107684

(51) Int. Cl.
*H01M 50/136* (2021.01)
*H01M 12/08* (2006.01)
*H01M 50/105* (2021.01)

(52) U.S. Cl.
CPC ......... *H01M 50/136* (2021.01); *H01M 12/08* (2013.01); *H01M 50/105* (2021.01); *H01M 2300/0085* (2013.01)

(58) Field of Classification Search
CPC .. H01M 50/105; H01M 50/136; H01M 12/00; H01M 12/06; H01M 12/08; H01M 10/0565; H01M 2300/0085
See application file for complete search history.

(56) References Cited

U.S. PATENT DOCUMENTS

2011/0281160 A1 11/2011 Doi
2020/0251783 A1* 8/2020 Shimizu ................ H01M 4/043

FOREIGN PATENT DOCUMENTS

JP H0465071 3/1992
JP 2003346867 12/2003
(Continued)

OTHER PUBLICATIONS

PCT International Search Report (with English translation) for corresponding PCT Application No. PCT/JP2022/009650, mailed Apr. 19, 2022, 4 pages.
(Continued)

*Primary Examiner* — Christopher P Domone
(74) *Attorney, Agent, or Firm* — Dority & Manning, P.A.

(57) ABSTRACT

A sheet for folding batteries includes a sheet that has one surface and another surface, and has a plurality of intended fold lines parallel to each other set on the sheet, at least one electrolyte part that is placed between a pair of the intended fold lines on the sheet, and a plurality of electrode parts that is placed, on the sheet, next to the electrolyte part with the intended fold line interposed therebetween. The electrolyte part includes a through hole provided between the one surface and the other surface of the sheet, and an electrolyte layer that is formed on the one surface and the other surface of the sheet so as to face each other across the through hole and is integrated via the through hole.

15 Claims, 4 Drawing Sheets

(56) References Cited

FOREIGN PATENT DOCUMENTS

| | | |
|---|---|---|
| JP | 2005251740 | 9/2005 |
| JP | 2009537947 | 10/2009 |
| JP | 2013131463 | 7/2013 |
| JP | 2013222602 | 10/2013 |
| JP | 2020126769 | 8/2020 |
| WO | WO 2007/132994 | 11/2007 |
| WO | WO 2010/089855 | 8/2010 |

OTHER PUBLICATIONS

Schroeder et al., "An electric-eel-inspired soft power source from stacked hydrogels", NATURE, vol. 552, Dec. 2017, pp. 214-218.

* cited by examiner

[FIG. 1A]
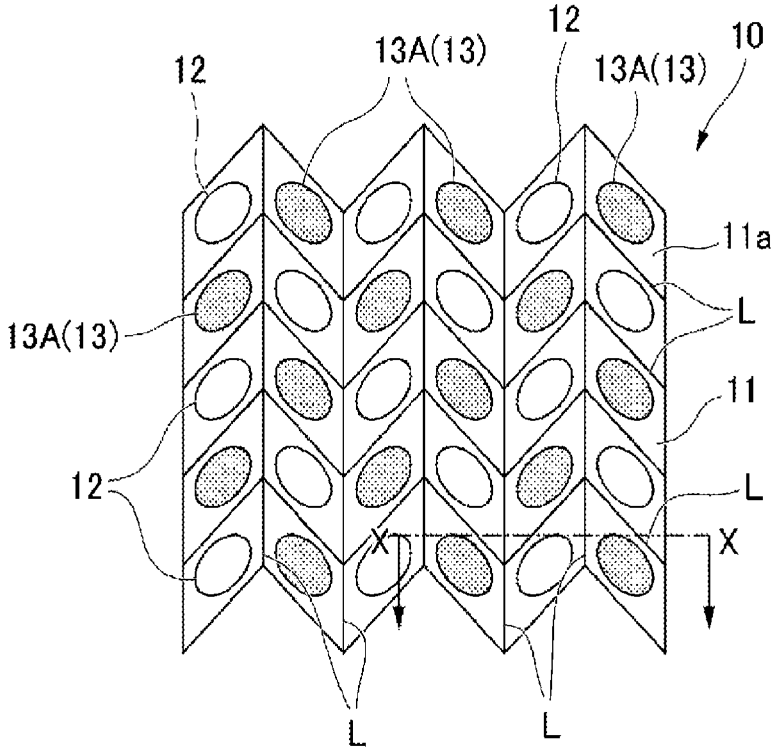
[FIG. 1B]
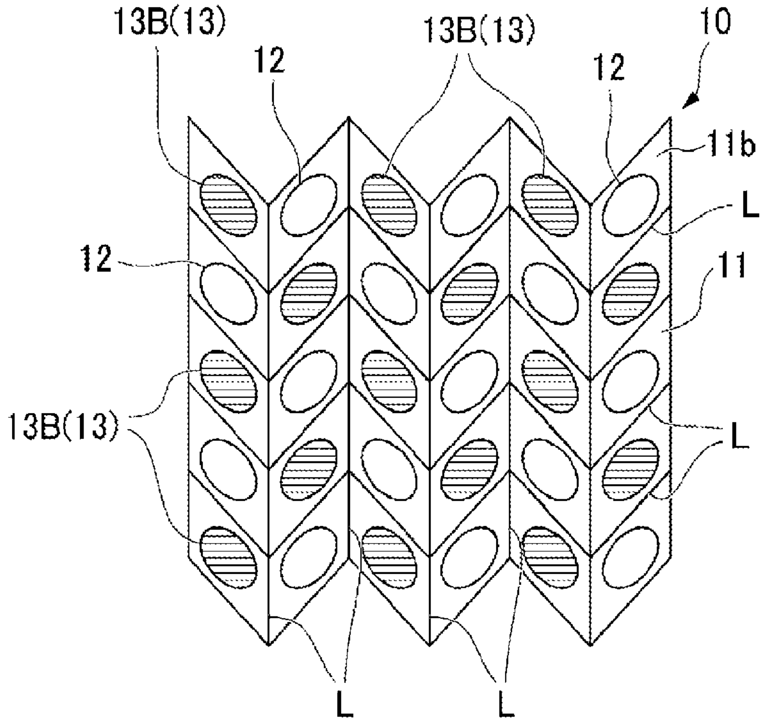

[FIG. 2]
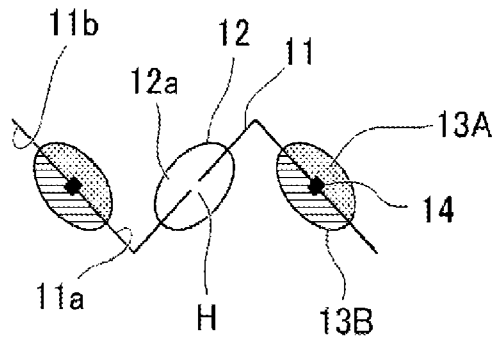
[FIG. 3]
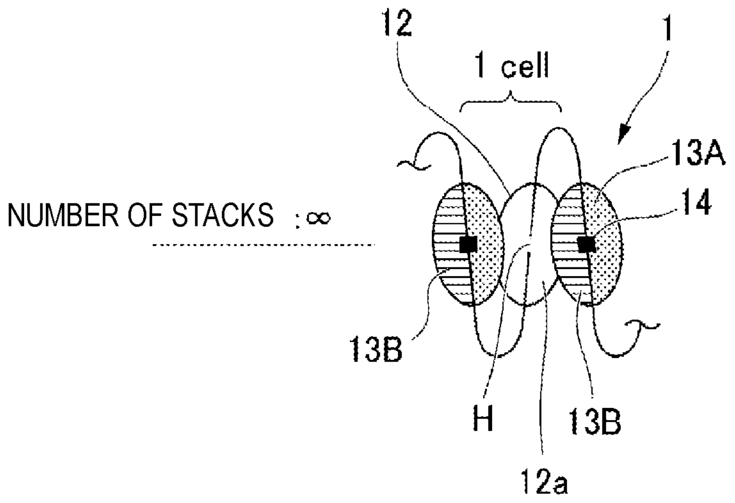
[FIG. 4A]
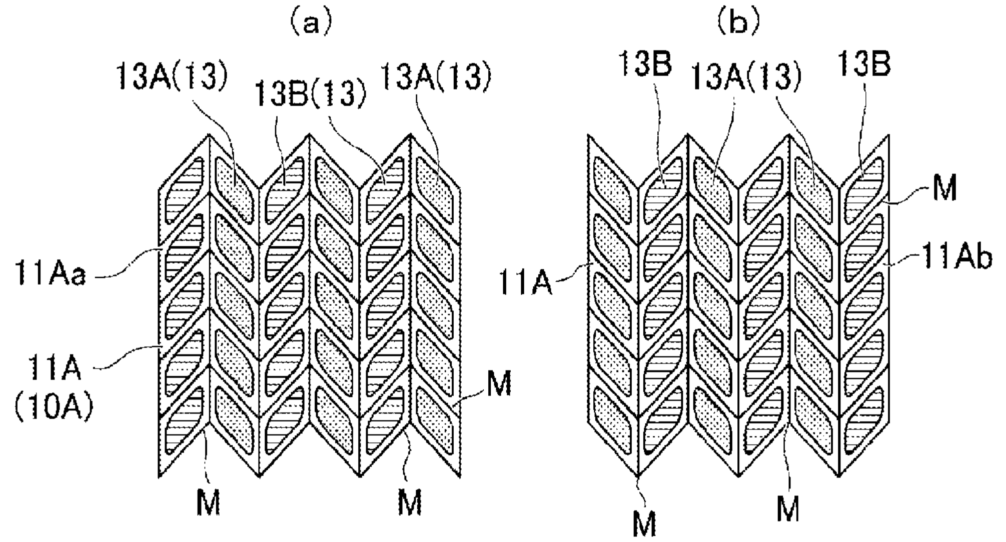

[FIG. 4B]
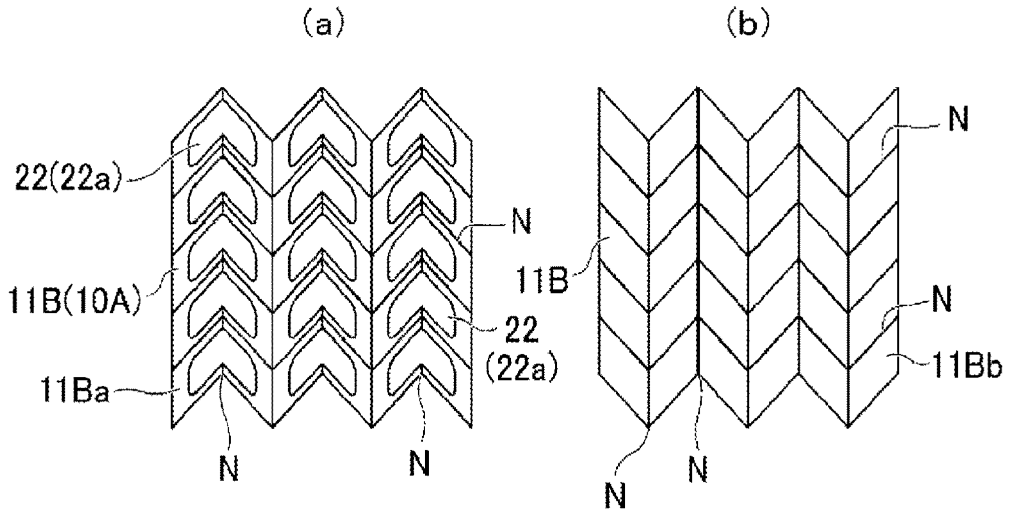
[FIG. 4C]
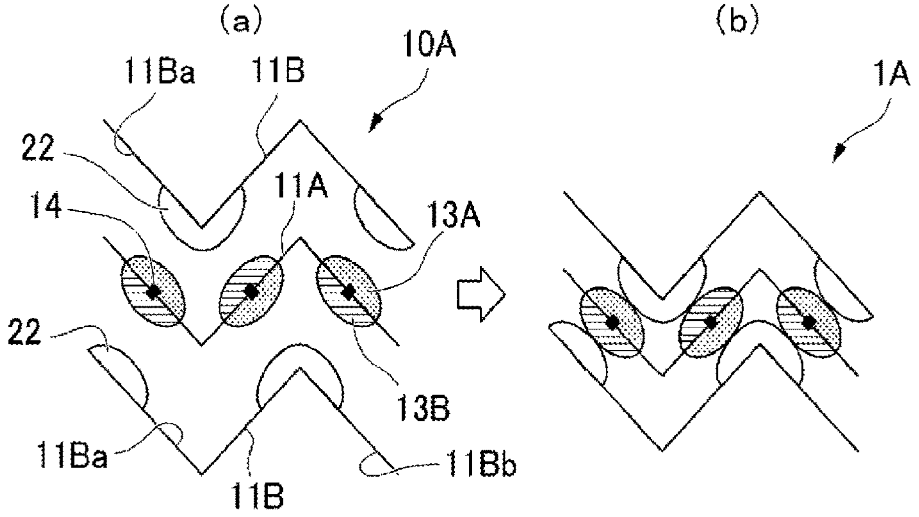
[FIG. 5A]
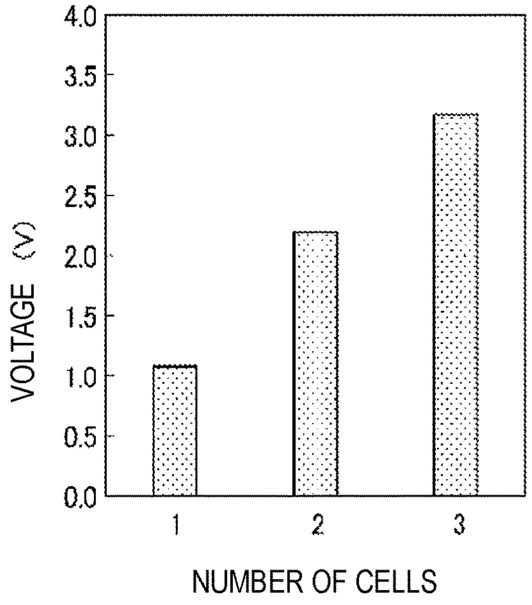

[FIG. 5B]
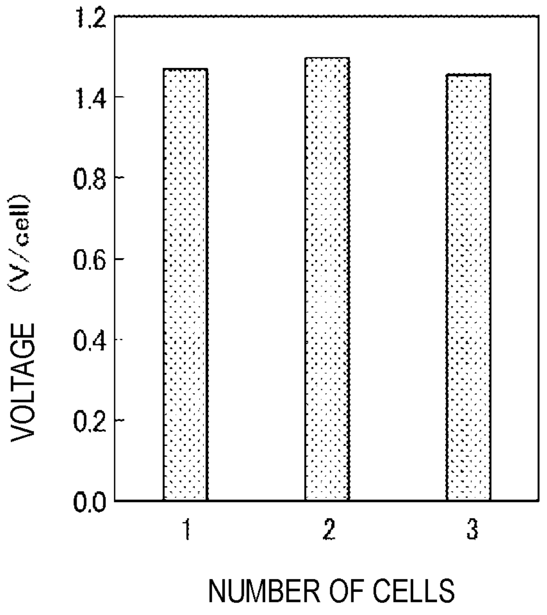

SHEET FOR FOLDING BATTERIES, FOLDING BATTERY, AND METHOD FOR PRODUCING FOLDING BATTERY

CROSS REFERENCE TO RELATED APPLICATIONS

This application is the U.S. National Stage entry of International Application No. PCT/JP2022/009650, filed on Mar. 7, 2022, which, in turn, claims priority to Japanese Patent Application No. 2021-107684, filed on Jun. 29, 2021, the disclosures both of which are hereby incorporated herein by reference in their entireties for all purposes.

TECHNICAL FIELD

The present invention relates to a sheet for folding batteries, a folding battery, and a method for producing the folding battery. This application is based upon and claims the benefit of priority from Japanese Patent Application No. 2021-107684, filed in Japan on Jun. 29, 2021, the contents of which are incorporated herein by reference.

BACKGROUND ART

Known examples of batteries used in various electronic devices include stacked batteries.

The stacked batteries have recently been of great interest because the voltage of the batteries can be set to any voltage by changing the number of stacks, coupled with expectations for increased capacity.

PTL 1 discloses a stacked all-solid-state secondary battery in which all-solid-state secondary batteries are connected in series.

Further, PTL 2 relates to a stacked battery and discloses an electrode structure including a negative electrode-separator pressure-bonded body in which a belt like negative electrode body is pressure-bonded between a pair of separators which extends in a belt shape; and a positive electrode coupling body in which a plurality of positive electrodes is connected to each other by a positive electrode lead which extends in a belt shape. In the stacked battery described in PTL 2, the negative electrode-separator pressure-bonded body has creases so that mountain folds and valley folds are alternately made between adjacent negative electrodes. On the other hand, the positive electrode coupling body has a structure in which adjacent positive electrodes are alternately inserted in one surface side and the other surface side of the negative electrode-separator pressure-bonded body, are assembled so as to face the negative electrode where a negative electrode lead is formed across the separator, and are folded with the negative electrode-separator pressure-bonded body.

CITATION LIST

Patent Literature

PTL 1: JPH04-065071A
PTL 2: JP2013-222602A

Non-Patent Literature

NPL 1: Thomas B. H. Schroeder, Anirvan Guha, Aaron Lamoureux, Gloria VanRenterghem, David Sept, Max Shtein, Jerry Yang, and Michael Mayer, NATURE Volume 552 (14 Dec. 2017) p 214-218.

SUMMARY OF INVENTION

Technical Problem

Various types of stacked batteries have been studied so far, as in PTL 1 and PTL 2. In recent years, however, further miniaturization and higher capacity of batteries have been desired.

Further, NPL 1 discloses a folding concentration cell, but the potential per cell is 150 mV or so and the current obtained is as low as several μA or so. Thus, the performance of the folding concentration cell described in NPL 1 is insufficient for use in various electronic devices. In addition, the manufacturing process of the concentration cell described in NPL 1 is complex and requires more man-hours because the concentration cell needs a difference in concentration between electrolytes adjacent to each other with an electrode interposed therebetween.

Further, since it is necessary to make a difference in concentration between the electrolytes as described above, the size of the cell inevitably increases.

Here, among various batteries, a metal-air battery is known as a relatively small (lightweight) battery. Such metal-air batteries are starting to attract attention because of the small size and high capacity. The metal-air batteries are being considered for use in, particularly, batteries for disaster, batteries for emergency, and so on.

However, the metal-air battery has a problem that a metal electrode deteriorates due to contact between an electrolyte and a metal electrode (negative electrode) of the components of the metal-air battery. In other words, even if the metal-air battery is made simply as a stacked battery, although a high capacity can be achieved, there is a problem that the battery performance degrades due to the deterioration in the metal electrode.

Further, assuming that a battery is used in a disaster or emergency, it is desirable that the battery can be stored for a long period of time without degradation of the battery performance. However, in a case where the metal-air battery is stored for a long period of time, the battery performance degrades over time due to the deterioration in the metal electrode described above. Therefore, it has been very difficult to store the metal-air battery for a long period of time without degradation of the battery performance.

The invention has been achieved in light of such problems, and therefore, an object of the invention is to provide a sheet for folding batteries that can be stored for a long period of time without degradation of the battery performance and can easily produce a compact folding battery. A further object of the invention is to provide a folding battery including such a sheet for folding batteries, and a method for producing the folding battery.

Solution to Problem

The present inventors have studied a method for reducing the degradation of the battery performance that occurs when a battery is stored for a long period of time. As a result, the inventors found out that aging degradation of the battery performance can be prevented until just before starting to use the battery by the following: properly arranging, in advance, the constituent elements as the battery on a sheet, and then folding the sheet to form a battery at the stage of starting to use it as the battery. Further, when the constituent elements of the battery are arranged on the sheet, the constituent elements are properly placed to form a predetermined arrangement pattern. This enables achieving a connection of multiple layers in series, resulting in providing a high-voltage battery.

The invention was made based on the above findings, and the gist thereof is as follows.

[1] A sheet for folding batteries according to an aspect of the invention includes a sheet that has one surface and another surface, and has a plurality of intended fold lines parallel to each other set on the sheet; at least one electrolyte part that is placed between a pair of the intended fold lines on the sheet; and a plurality of electrode parts that is placed, on the sheet, next to the electrolyte part with the intended fold line interposed therebetween, in which the electrolyte part includes a through hole provided between the one surface and the other surface of the sheet, and an electrolyte layer that is formed on the one surface and the other surface of the sheet so as to face each other across the through hole and is integrated via the through hole.

[2] In the sheet for folding batteries as in [1], the electrolyte part may be staggered when the sheet is viewed in plan.

[3] In the sheet for folding batteries as in [1] or [2], the electrode part may include a positive electrode layer provided on the one surface of the sheet, a negative electrode layer that is provided, on the other surface of the sheet, at a position facing the positive electrode layer across the sheet, and a conductor that penetrates the sheet to electrically connect the positive electrode layer and the negative electrode layer to each other.

[4] In the sheet for folding batteries as in [3], the positive electrode layer may be placed so as to come into contact with the electrolyte layer provided on the one surface side of the sheet in a case where the sheet is folded along the intended fold lines.

[5] In the sheet for folding batteries as in [3] or [4], the negative electrode layer may be placed so as to come into contact with the electrolyte layer provided on the other surface side of the sheet in a case where the sheet is folded along the intended fold lines.

[6] In the sheet for folding batteries as in any one of [1] to [5], the electrolyte layer may be in a gel or solid form.

[7] In the sheet for folding batteries as in any one of [1] to [6], the sheet may be made of a hydrophobic sheet.

[8] In the sheet for folding batteries as in any one of [1] to [7], a separator may be embedded in the through hole.

[9] A folding battery according to an aspect of the invention includes the sheet for folding batteries as in any one of [1] to [8].

[10] A method for producing a folding battery according to an aspect of the invention is a method for producing the folding battery including the sheet for folding batteries as in any one of [1] to [8], and the method includes setting a plurality of the intended fold lines parallel to each other on the sheet having the one surface and the other surface; and folding the sheet along the intended fold lines so that the electrode part and the electrolyte part adjacent to each other come into contact with each other.

[11] In the method for producing the folding battery as in [10] described above, the electrode part includes a positive electrode layer provided on the one surface of the sheet, a negative electrode layer that is provided, on the other surface of the sheet, at a position facing the positive electrode layer across the sheet, and a conductor that penetrates the sheet to electrically connect the positive electrode layer and the negative electrode layer to each other, and in a case where the sheet is folded along the intended fold lines, the sheet may be folded in such a manner that the positive electrode layer comes into contact with the electrolyte layer on the one surface side of the sheet and the negative electrode layer comes into contact with the electrolyte layer on the other surface side of the sheet.

[12] A sheet for folding batteries according to another aspect of the invention includes an electrode part sheet that has one surface and another surface, and has a plurality of intended fold lines for electrode part set on the electrode part sheet, the plurality of intended fold lines for electrode part being parallel to each other; an electrolyte part sheet that has one surface and another surface, and has a plurality of intended fold lines for electrolyte part set on the electrolyte part sheet, the plurality of intended fold lines for electrolyte part being parallel to each other; a plurality of electrolyte parts that is placed, on the one surface of the electrolyte part sheet, on both sides of the intended fold line for electrolyte part; and a plurality of electrode parts that is placed, on the one surface and the other surface of the electrode part sheet, between the intended fold lines for electrode part, in which the electrolyte part includes an electrolyte layer that is formed on the one surface of the electrolyte part sheet and integrated on the intended fold line for electrolyte part.

[13] In the sheet for folding batteries as in [12], the electrode part includes, on both sides of the electrode part sheet, a plurality of positive electrode layers and a plurality of negative electrode layers that are provided in a grid pattern, and a conductor that penetrates the electrode sheet to electrically connect the positive electrode layer and the negative electrode layer to each other, the plurality of positive electrode layers may be placed along the intended fold lines for electrode part, the plurality of negative electrode layers may be so placed as to be adjacent to a column of the plurality of positive electrode layers with the intended fold line for electrode part interposed therebetween, and the positive electrode layer and the negative electrode layer may be so provided at positions facing each other across the electrode part sheet.

[14] A folding battery according to another aspect of the invention includes the sheet for folding batteries as in [12] or [13].

[15] A method for producing a folding battery according to another aspect of the invention is a method for producing the folding battery including the sheet for folding batteries as in [12] or [13], and the method includes overlapping the electrolyte part sheet on both surfaces of the electrode part sheet so that the electrode part and the electrolyte part come into contact with each other, and subsequently, folding each of the sheets along the intended fold lines for electrode part and the intended fold lines for electrolyte part in such a manner that the electrode parts adjacent to each other on the electrode part sheet face each other across the electrolyte part on the electrolyte part sheet.

Advantageous Effects of Invention

According to the embodiments of the invention, it is possible to provide a sheet for folding batteries that can be stored for a long period of time without degradation of the battery performance and can easily produce a compact folding battery. According to the embodiments of the invention, it is further possible to provide a folding battery including such a sheet for folding batteries, and a method for producing the folding battery.

BRIEF DESCRIPTION OF DRAWINGS

FIG. 1A is a perspective view of a sheet for folding batteries according to the present embodiment, as viewed from one surface side.

FIG. 1B is a perspective view of the sheet for folding batteries according to the embodiment, as viewed from another surface side.

FIG. 2 is a schematic cross-sectional view taken along the line segment X-X of FIG. 1A.

FIG. 3 is a schematic diagram of a folding battery 1 according to the embodiment.

FIG. 4A(a) is a perspective view of an electrode part sheet of a sheet for folding batteries according to a modification to the embodiment, as viewed from one surface side. FIG. 4A(b) is a perspective view of an electrode part sheet of a sheet for folding batteries according to the embodiment, as viewed from another surface side.

FIG. 4B(a) is a perspective view of an electrolyte part sheet of the sheet for folding batteries according to a modification to the embodiment, as viewed from one surface side. FIG. 4B(b) is a perspective view of an electrolyte part sheet of the sheet for folding batteries according to the embodiment, as viewed from another surface side.

FIG. 4C(a) is a schematic diagram illustrating an arrangement example in which the electrode part sheet and the electrolyte part sheet of the sheet for folding batteries according to the modification to the embodiment overlap each other. FIG. 4C(b) is a schematic diagram of a folding battery 1A according to the modification to the embodiment.

FIG. 5A is a graph showing a total voltage of each stack in an example.

FIG. 5B is a graph showing an average voltage per cell (total voltage/number of cells) in each stack in the example.

DESCRIPTION OF EMBODIMENTS

Hereinafter, a description is given of a sheet for folding batteries, a folding battery, and a method for producing the folding battery according to the embodiment with reference to the drawings.

In the drawings used in the following description, some characteristic parts are enlarged for convenience in order to make the features easier to understand, and the dimensional ratios of constituent elements and the like may not necessarily be the same as the actual ones. Further, the materials, dimensions, and so on exemplified in the following description are taken as examples, and the embodiment is not necessarily limited thereto. The embodiment can be implemented with appropriate modifications within the scope of not changing the gist thereof.

[Sheet for Folding Batteries]

FIG. 1A is a perspective view of a sheet for folding batteries according to the embodiment, as viewed from one surface side. FIG. 1B is a perspective view of the sheet for folding batteries according to the embodiment, as viewed from another surface side. Further, FIG. 2 is a schematic cross-sectional view taken along the line segment X-X of FIG. 1A.

As illustrated in FIGS. 1A and 1B, a sheet for folding batteries 10 according to the embodiment includes a sheet 11, a plurality of electrolyte parts 12 arranged on the sheet 11, and a plurality of electrode parts 13 arranged on the sheet 11. FIGS. 1A and 1B illustrate an example in which the plurality of electrolyte parts 12 is provided; however, the embodiment is not limited to the example, and the number of electrolyte parts 12 may be one. Stated differently, two electrode parts 13 and one electrolyte part 12 are enough to function as a battery. For the sake of explanation, the example in which the plurality of electrolyte parts 12 is provided on the sheet 11 is described below.

The sheet 11 is made of a hydrophobic sheet. Specifically, it is only required that the sheet 11 be a film-like sheet made of an insulator, and the material of the sheet 11 is not particularly limited. Examples of the material of the sheet 11 include polyethylene terephthalate, polypropylene, and polyvinyl chloride. In terms of durability, it is preferable to use polyethylene terephthalate as the material of the sheet 11 because the electrolyte parts 12 and the electrode parts 13, descried later, are placed on the sheet 11.

In a case where the sheet for folding batteries 10 is applied to various batteries, the material of the sheet 11 may be determined appropriately according to the characteristics required for a battery to which the sheet for folding batteries 10 is applied. For example, in a case where the sheet for folding batteries 10 is applied to a metal-air battery, a paper sheet having good air permeability is used as the sheet 11, which further improves the battery performance.

As illustrated in FIGS. 1A and 1B, the sheet 11 includes one surface 11*a* and another surface 11*b*, and a plurality of intended fold lines L, parallel to each other, is set on the sheet 11. As described later, in producing a battery using the sheet for folding batteries 10, the battery can be formed by folding the sheet 11 along the intended fold lines L. Accordingly, the intended fold lines L on the sheet 11 are so set that the electrolyte part 12 and the electrode part 13 adjacent to each other can come into contact with each other when the sheet 11 is folded. Specifically, the placement of the intended fold lines L is so set that, when the sheet 11 is folded along the plurality of intended fold lines L, mountain folds and valley folds are seen alternately.

The thickness of the sheet 11 is not particularly limited, and may be so set that the sheet 11 can be folded in producing a battery, as described above. Further, the thickness may be designed appropriately according to the material used for the sheet 11. As the thickness of the sheet 11 is increased, the area of a metal powder, a catalyst, and so on within the electrode part 13 that contributes to the reaction can be increased, and thus, a large current value can be obtained. On the other hand, as the thickness of the sheet 11 is decreased, a current value obtained is reduced. Accordingly, in order to obtain a large current value, it is desirable to increase the thickness of the sheet 11. However, the excessively thick sheet 11 would make the battery bulky when the sheet for folding batteries 10 is folded. In addition, the excessively thick sheet 11 would make it difficult to fold the sheet for folding batteries 10 in such a manner that a positive electrode layer 13A and a negative electrode layer 13B overlap each other with an electrolyte layer 12*a* interposed therebetween, which may lead to poor contact between the elements on the sheet. Further, the larger the thickness of the sheet 11, the larger the internal resistance of the battery, which can result in reduced power output. In light of the above, the thickness of the sheet 11 is preferably 100 μm to 1000 μm.

The plurality of electrolyte parts 12 is placed between a pair of intended fold lines L on the sheet 11. Further, as illustrated in FIGS. 1A and 1B, the columns of the electrolyte parts 12 that face each other with the intended fold line L interposed therebetween are arranged in such a manner that the electrolyte parts 12 do not overlap each other when the sheet for folding batteries 10 is folded. For example, the plurality of electrolyte parts 12 may be staggered when the sheet for folding batteries 10 is viewed in plan. Stated differently, the plurality of electrolyte parts 12 on the sheet are so placed that the electrolyte parts 12 are not adjacent to each other with respect to the intended fold lines L.

As illustrated in FIG. 2, the electrolyte part 12 includes a through hole H provided between the one surface 11*a* and the other surface 11*b* of the sheet 11, and the electrolyte layer 12*a* formed on the one surface 11*a* and the other surface 11*b* of the sheet 11 so as to face each other across the through hole H.

The electrolyte layer 12*a* on the one surface 11*a* of the sheet 11 and the electrolyte layer 12*a* on the other surface 11*b* of the sheet 11 are integrated with each other via the through hole H. The through hole H is an element serving to conduct ions when the sheet for folding batteries 10 is folded to form a battery. The number of through holes H may be one for each electrolyte part 12 as illustrated in FIG. 2. Instead, however, the number of through holes H may be determined appropriately according to the shapes or dimensions of the sheet 11, the electrolyte part 12, and so on. The plurality of through holes H may be provided for each electrolyte part 12.

The electrolyte layer 12*a* is desirably in a gel or solid form.

The sheet for folding batteries 10 according to the embodiment can be folded to form a battery. However, it is desirable that the sheet for folding batteries 10 be stored with contact between the elements (electrolyte parts 12 and electrode parts 13) on the sheet 11 avoided until the battery is formed. In order to accomplish this, it is effective to reduce an excessive deformation of the electrolyte layer 12*a* and a leakage of the electrolyte layer 12*a* to another element. Thus, in the embodiment, the electrolyte layer 12*a* is desirably in a gel or solid form in order to reduce an excessive deformation of the electrolyte layer 12*a* and a leakage of the electrolyte layer 12*a* to another element.

In order to make the electrolyte layer 12*a* in a gel or solid form, the material of the electrolyte layer 12*a*, which will be described later, may contain a gelling agent or a thickening agent, for example. Examples of the gelling agent include gelatin, agarose, acrylamide, poly (ethylene glycol) diacrylate, and poly (ethylene glycol) dimethacrylate. Among them, the use of poly (ethylene glycol) diacrylate or poly (ethylene glycol) dimethacrylate is desirable because they are resistant to alkalinity and can easily gelate under light irradiation. However, in a case where the chain lengths of poly (ethylene glycol) diacrylate and poly (ethylene glycol) dimethacrylate are too short (for example, the degree of polymerization is 1 to 3), they solidify. Accordingly, it is desirable to use poly (ethylene glycol) diacrylate or poly (ethylene glycol) dimethacrylate having a certain length or more (for example, the degree of polymerization is 5 or greater) in order to provide a soft gel state. In a case where poly (ethylene glycol) diacrylate or poly (ethylene glycol) dimethacrylate is used as the gelling agent, it is desirable to mix an acrylic monomer with a radical initiator and promote the gelation by heating, light, or the like. Alternatively, gelatin alone may be used as the electrolyte layer 12*a*.

The material of the electrolyte layer 12*a* can be, for example, an aqueous electrolytic solution. Examples of the aqueous electrolytic solution include alkaline aqueous solutions such as a potassium hydroxide solution and an aqueous sodium hydroxide, neutral aqueous solutions such as a potassium chloride solution and a sodium chloride solution, and acidic aqueous solutions such as a sulfuric acid solution. The total ion concentration of the aqueous electrolytic solution is preferably 1 mmol/L or greater, and is more preferably 100 mmol/L or greater. In a case where the sheet for folding batteries 10 of the embodiment is applied to a metal-air battery, it is particularly desirable to use an alkaline aqueous solution among the solutions above in order to increase the output of the metal-air battery. As the material of the electrolyte layer 12*a*, one material may be used alone, or two or more materials may be used in combination. Note that the electrolyte layer 12*a* is not limited to the examples described above, and may be an inorganic electrolyte.

The thickness of the electrolyte layer 12*a* is not particularly limited. However, the thickness of the electrolyte layer 12*a* is preferably 0.1 mm or greater because decreasing the thickness excessively may reduce the battery performance, particularly, reduce the capacity. On the other hand, increasing the thickness of the electrolyte layer 12*a* excessively sometimes makes it difficult to precisely fold the sheet for folding batteries 10. Further, for the purpose of making the battery more compact, a smaller thickness of the electrolyte layer 12*a* is preferable. For example, the thickness of the electrolyte layer 12*a* is preferably 3 mm or less.

Further, a separator may be embedded in the through hole H of the electrolyte part 12.

As described above, the through hole H of the electrolyte part 12 is an element serving to conduct ions when the sheet for folding batteries 10 is folded to form a battery. However, in a case where the electrode parts 13 (positive electrode layer 13A and negative electrode layer 13B) arranged on both sides with the electrolyte part 12 interposed therebetween are too close to each other after folding the sheet for folding batteries 10, an electrical short circuit may occur. To cope with this, it is desirable to embed the separator in the through hole H. Embedding the separator in the through hole H can isolate the positive electrode layer 13A and the negative electrode layer 13B from each other, and achieve sufficient ion conductivity between the positive electrode layer 13A and the negative electrode layer 13B with the electrolyte part 12 supported.

Examples of the material of the separator include porous polyethylene, porous polypropylene, non-woven fabric, and polyamide fiber, but the separator is not limited to these examples.

The electrode part 13 is placed next to the electrolyte part 12 with the intended fold line L interposed therebetween. This enables the electrolyte part 12 and the electrode part 13 to overlap each other when the sheet for folding batteries 10 is folded along the intended fold lines L, so that a battery can be provided.

As illustrated in FIGS. 1A, 1B, and 2, the electrode part 13 includes the positive electrode layer 13A provided on the one surface 11*a* of the sheet 11, the negative electrode layer 13B that is provided, on the other surface 11*b* of the sheet 11, at a position facing the positive electrode layer 13A across the sheet 11, and a conductor 14 that electrically connects the positive electrode layer 13A and the negative electrode layer 13B to each other.

The positive electrode layers 13A provided on the one surface 11*a* of the sheet 11 are placed so as to come into contact with the electrolyte layers 12*a* provided on the one surface 11*a* side of the sheet 11 in a case where the sheet 11 is folded along the intended fold lines L. Stated differently, as viewed in plan from the one surface 11*a* side of the sheet 11, the positive electrode layers 13A and the electrolyte layers 12*a* are provided in a grid pattern so as to alternate with each other on the one surface 11*a* of the sheet 11.

Further, the negative electrode layers 13B provided on the other surface 11*b* of the sheet 11 are placed so as to come into contact with the electrolyte layers 12*a* provided on the other surface 11*b* side of the sheet 11 in a case where the sheet 11 is folded along the intended fold lines L. Stated differently, as viewed in plan from the other surface 11*b* side of the sheet 11, the negative electrode layers 13B and the electrolyte layers 12*a* are provided in a grid pattern so as to alternate with each other on the other surface 11*b* of the sheet 11.

The positive electrode layer 13A is an element that serves as a positive electrode in a case where the sheet for folding batteries 10 folded to form a battery. Accordingly, any material that is used as a normal material of a positive electrode can be used for the positive electrode layer 13A. For example, in a case where the sheet for folding batteries 10 is applied to a metal-air battery, the positive electrode layer 13A serves as an air electrode (oxygen electrode). In such a case, examples of the material of the positive electrode layer 13A include platinum-carrying carbon material (platinum-supported carbon), iron phthalocyanine-carrying carbon material, and manganese oxide-carrying carbon material that accelerate reduction reaction.

The negative electrode layer 13B is an element that serves as a negative electrode in a case where the sheet for a folding batteries 10 is folded to form battery. Accordingly, any material that is used as a normal material of a negative electrode can be used for the negative electrode layer 13B. For example, in a case where the sheet for folding batteries 10 is applied to a metal-air battery, examples of the material of the negative electrode layer 13B include a simple metal such as zinc, manganese, and lithium, an alloy thereof, or a metal oxide thereof.

The forms of the positive electrode layer 13A and the negative electrode layer 13B are not particularly limited. The positive electrode layer 13A and the negative electrode layer 13B may be formed by applying a positive electrode material in paste form and a negative electrode material in paste form to the sheet 11, respectively. Alternatively, the positive electrode layer 13A and the negative electrode layer 13B may be formed by using an ink jet coating device and the likes to apply particles (metal particles) of the positive electrode material and the negative electrode material, respectively.

As illustrated in FIG. 2, the conductor 14 for electrically connecting the positive electrode layer 13A and the negative electrode layer 13B to each other is provided so as to penetrate the sheet 11. In other words, the positive electrode layer 13A and the negative electrode layer 13B provided on the one surface 11*a* and the other surface 11*b* of the sheet 11 respectively are provided so as to overlap each other through the conductor 14 provided on the sheet 11.

The conductor 14 is an element that electrically connects the positive electrode layer 13A and the negative electrode layer 13B overlapping each other with the sheet 11 interposed therebetween and supports the positive electrode layer 13A and the negative electrode layer 13B in a case where the sheet for folding batteries 10 is folded to form a battery. Thus, any material that has electronic conductivity may be used for the conductor 14. Examples of such materials include carbon, metal, and a conductive polymer.

The form of the conductor 14 is not particularly limited. The form may be determined appropriately according to the materials of the conductor 14 and the sheet 11, the forms and materials of the positive electrode layer 13A and the negative electrode layer 13B, and so on. For example, in the case of using carbon as the material of the conductor 14, the conductor 14 may have an ink-like form (carbon ink) or a plate-like form (carbon plate). In the case of using carbon ink as the form of the conductor 14, a casting method is used, for example, to apply carbon ink to penetrate the both surfaces of the sheet 11 and then dry the same, so that the conductor 14 can be formed. Alternatively, in the case of using a carbon plate as the form of the conductor 14, for example, a carbon plate that is precut in a desired size is so placed as to penetrate the sheet 11, so that the conductor 14 can be formed.

[Folding Battery]

FIG. 3 illustrates a folding battery 1 according to the embodiment.

As illustrated in FIG. 3, the folding battery 1 includes the sheet for folding batteries 10, and is provided by folding the sheet for folding batteries 10 along the intended fold lines L.

For the sake of explanation, FIG. 3 illustrates a part corresponding to one cell. However, the plurality of battery elements (electrolyte parts 12 and electrode parts 13) is actually arranged on the sheet 11. Thus, folding the sheet for folding batteries 10 along the intended fold lines L connects a multiple of layers in series.

[Method for Producing Folding Battery]

The folding battery 1 according to the embodiment can be obtained by using the sheet for folding batteries 10 and folding the sheet 11 along the intended fold lines L so that the electrode parts 13 and the electrolyte parts 12 come into contact with each other.

Specifically, first, creases are made, along the intended fold lines L, in the sheet for folding batteries 10 so that mountain folds and valley folds are alternately made. Further, the sheet 11 is folded along the creases in such a manner that the positive electrode layers 13A and the negative electrode layers 13B overlap each other via the electrolyte layers 12*a*. In other words, the sheet 11 is folded along the intended fold lines L in such a manner that the positive electrode layers 13A come into contact with the electrolyte layers 12*a* on the one surface 11*a* side of the sheet 11 and the negative electrode layers 13B come into contact with the electrolyte layers 12*a* on the other surface 11*b* side of the sheet 11. Thereby, the folding battery 1 as illustrated in FIG. 3 can be produced.

Further, as a method for folding the sheet for folding batteries 10, the so-called "Miura fold" can be used for example, in addition to a so-called "accordion fold" as illustrated in FIGS. 1A and 1B.

The accordion fold illustrated in FIG. 1A is different from the Miura fold in method for setting intended fold lines.

In the accordion fold of FIG. 1A, the intended fold lines L are so set as to be parallel to each other, and assuming that a region surrounded by the intended fold lines L is one square, each square has a rectangular shape. On the other hand, in the case of the Miura fold, the intended fold lines are zigzag lines and each square has a parallelogram shape. Even in the case of using the Miura fold, the placement of the constituent elements of the electrolyte part and the electrode part can be similar to that illustrated in FIG. 1A.

Since the Miura fold can be made by simply pressing a diagonal part, the folding battery can be easily produced.

Modification to Embodiment

In the embodiment describe above, the description is given of the folding battery 1 using one sheet for folding batteries 10. However, the invention is not limited thereto and two or more sheets for folding batteries may be used to form a folding battery.

FIG. 4A(a) is a perspective view of an electrode part sheet 11A of a sheet for folding batteries 10A according to a modification to the embodiment, as viewed from one surface side. FIG. 4A(b) is a perspective view of the electrode part sheet 11A of the sheet for folding batteries 10A according to the embodiment, as viewed from another surface side. FIG. 4B(a) is a perspective view of an electrolyte part sheet 11B of the sheet for folding batteries 10A according to the modification to the embodiment, as viewed from one surface side. FIG. 4B(b) is a perspective view of the electrolyte part sheet 11B of the sheet for folding batteries 10A according to the embodiment, as viewed from the other surface side. Further, FIG. 4C is a schematic cross-sectional view of a state in which the electrode part sheet 11A and the electrolyte part sheet 118 overlap each other.

The same reference signs are given to the configurations and elements common to the sheet for folding batteries 10 of the embodiment illustrated in FIG. 1A, and detailed descriptions thereof are omitted.

The sheet for folding batteries 10A according to the modification to the embodiment includes the electrode part sheet 11A that has one surface 11Aa and another surface 11Ab and has a plurality of intended fold lines M for electrode part parallel to each other as illustrated in FIG. 4A, and the electrolyte part sheet 118 that has one surface 11Ba and another surface 11Bb and has a plurality of intended fold lines N for electrolyte part parallel to each other as illustrated in FIG. 4B.

Further, the sheet for folding batteries 10A includes a plurality of electrolyte parts 22 that is placed, on the one surface 11Ba of the electrolyte part sheet 11B, on both sides of the intended fold lines N for electrolyte part. The electrolyte part 22 has an electrolyte layer 22*a* that is formed on the one surface 11Ba of the electrolyte part sheet 11B and integrated on the intended fold line N for electrolyte part. To be specific, the electrolyte part 22 is provided so as to straddle the intended fold line N for electrolyte part and integrated on the intended fold line N for electrolyte part. Incidentally, as illustrated in FIG. 4B(b), no electrolyte parts 22 are formed on the other surface 11Bb of the electrolyte part sheet 11B.

The specific materials and forms of the electrolyte layer 22*a* may be similar to those of the electrolyte layer 12*a* in the sheet for folding batteries 10 according to the embodiment described above.

Also in the modification, the electrolyte part 22 may have a through hole. In such a case, the through hole may be formed between the one surface 11Ba and the other surface 11Bb of the electrolyte part sheet 11B. In a case where the through hole is provided in the modification, the through hole may be placed at any position between the one surface 11Ba and the other surface 11Bb of the electrolyte part sheet 11B.

Further, the sheet for folding batteries 10A includes the plurality of electrode parts 13 that is placed between the intended fold lines M for electrode part on the one surface 11Aa and the other surface 11Ab of the electrode part sheet 11A.

The plurality of electrode parts 13 has, on both sides of the electrode part sheet 11A, the plurality of positive electrode layers 13A and the plurality of negative electrode layers 13B that are provided in a grid pattern in plan view, and the conductors 14 that penetrate the electrode part sheet 11A to electrically connect the positive electrode layers 13A and the negative electrode layers 13B to each other.

As illustrated in FIGS. 4A and 4B, the plurality of positive electrode layers 13A is arranged along the intended fold lines M for electrode part. The plurality of negative electrode layers 13B is so placed as to be adjacent to a column of the plurality of positive electrode layers 13A with the intended fold lines M for electrode part interposed therebetween. In other words, columns of the positive electrode layers 13A and columns of the negative electrode layers 13B are alternately arranged in a direction orthogonal to the intended fold lines M for electrode part (in the left and right direction of FIG. 4A).

Further, the positive electrode layers 13A and the negative electrode layers 13B are so provided as to face each other across the electrode part sheet 11A. For example, the negative electrode layers 13B are provided on the opposite side (other surface 11Ab side) of the positive electrode layers 13A on the one surface 11Aa side of the electrode part sheet 11A across the electrode part sheet 11A. In short, the positive electrode layer 13A and the negative electrode layer 13B are so provided as to make a pair across the electrode part sheet 11A.

FIG. 4C (a) illustrates an arrangement example in which the electrode part sheet 11A and the electrolyte part sheet 11B of the sheet for folding batteries 10A according to a modification to the embodiment overlap each other. FIG. 4C (b) is a schematic diagram of a folding battery 1A according to the modification to the embodiment.

As illustrated in FIGS. 4C(a) and 4C(b), the folding battery 1A includes the sheet for folding batteries 10A having the electrode part sheet 11A and the electrolyte part sheet 11B. To be specific, the folding battery 1A can be obtained by overlapping at least one electrode part sheet 11A and two or more electrolyte part sheets 11B each other and folding the resultant along each of the intended fold lines M and N.

For the sake of explanation, FIGS. 4C(a) and 4C(b) illustrate a part corresponding to three cells. However, the plurality of battery elements is actually arranged on each sheet. Thus, the electrode part sheet 11A and the electrolyte part sheets 11B overlap each other and the resultant is further folded, so that a multiple of layers can be connected in series.

As for the folding battery 1A according to the modification to the embodiment, as illustrated in FIG. 4C(a), first, the electrolyte part sheet 11B is overlaid on each surface of the electrode part sheet 11A so that the electrode parts 13 and the electrolyte parts 22 come into contact with each other. Then, each sheet is folded along the intended fold lines M for electrode part and the intended fold lines N for electrolyte part in such a manner that the electrode parts 13 adjacent to each other on the electrode part sheet 11A (specifically, the positive electrode layers 13A and the negative electrode layers 13B) face each other across the electrolyte parts 22 on the electrolyte part sheets 11B. This can form the folding battery 1A.

The configurations of the sheet for folding batteries 10 of the embodiment and the sheet for folding batteries 10A of the modification have been described above. The configurations enable each element as a battery to be stored in a non-contact state. It is thus possible to store the sheet for folding batteries for a long period of time without degradation of the battery performance until just before the sheet for folding batteries is used as a battery. Further, in the sheet for folding batteries 10 according to the embodiment, since the elements of the battery are appropriately arranged on the sheet, a battery can be easily produced only by folding the sheet when the sheet is used as a battery. Further, the battery elements are appropriately arranged on the sheet to achieve a serial connection of multiple layers, resulting in providing a high-voltage battery.

Further, in a case where the sheet for folding batteries 10 of the embodiment or the sheet for folding batteries 10A is used to form a battery, one cell can be formed by overlapping, at least, a pair of the electrode parts and one electrolyte part, i.e., a total of three elements. Therefore, as compared with a conventional stacked battery (for example, a concentration cell that needs five elements per cell), a compact battery with a small thickness per cell is achieved. Further, according to the embodiment, a folding battery can be produced further simply because it is unnecessary to give variation in concentration to the electrolyte.

Further, using the sheet for folding batteries 10 according to the embodiment tor the sheet for folding batteries 10A according to the modification makes it possible to produce a three-dimensional battery from a sheet having a substantially flat structure. In other words, it can be stored as a sheet before being used as a battery, which may lead to reduction in storage space.

The sheets for folding batteries according to the embodiment and the modification thereto as described above are applicable to various batteries. For example, the sheets for folding batteries according to the embodiment and the modification thereto can be used in a metal-air battery, a fuel cell, a voltaic cell, a metal ion battery (e.g., lithium-ion battery), and so on. In such a case, the materials of each battery element placed on the sheet may be appropriately selected according to various batteries.

In the embodiment and the modification thereto, another configuration is possible in which only the separator is provided on the sheet 11 of the electrolyte part 12 without the through hole.

EXAMPLES

The invention will be described in more detail below by way of examples, but the invention is not limited to the following examples as long as the gist thereof is not exceeded.

As the sheet, a polyethylene terephthalate (PET) film with a thickness of 100 μm was used to form conductors, electrolyte parts, air electrodes (positive electrode parts), and metal electrodes (negative electrode parts) to have the arrangement pattern illustrated in FIGS. 1A and 1B to thereby make a sheet for folding batteries. The interval between the adjacent intended fold lines L was set at 10 mm.

A plurality of conductors was formed by applying carbon ink to both surfaces of the sheet so as to have a diameter of about 8 mm, and the resultant was heated at 120 degrees centigrade for one hour and dried. The carbon ink was applied to both surfaces of the sheet so as to sandwich a through hole (with a diameter of 2 mm) formed on the sheet.

Further, an electrolyte part was formed by using a mixture (pH 13) of potassium hydroxide (concentration: 0.1 mol/L), a gelling agent, and a radical initiator to coat the sheet with the mixture so as to have a diameter of about 8 mm. Specifically, first, poly (ethylene glycol) dimethacrylate (number average molecular weight Mn: 750, degree of polymerization: 17, manufactured by Sigma-Aldrich) was used as the gelling agent, and a mixture of the gelling agent and potassium hydroxide was prepared. Next, the electrolyte part was made by adding 1 volt of the radical initiator (2-hydroxy-2-methylpropiophenone (manufactured by Sigma-Aldrich)) to the mixture of the gelling agent and potassium hydroxide to mix together, and curing the mixture with light irradiation at a light intensity of about 750 $\mu W/cm^2$ using a light irradiation device with 365 nm (SLUV-4, manufactured by AS ONE Corporation).

Further, the air electrode and the metal electrode were formed respectively by applying a paste-like platinum-carrying carbon material (platinum-supported carbon) and zinc particles to have a diameter of 8 mm, and then heating the resultant at 120 degrees centigrade for two hours to dry the same.

The thickness of each of the electrolyte part, the air electrode, and the metal electrode was in the range of 100 μm to 200 μm. Further, a through hole having a diameter of 2 mm was formed on the sheets of the conductor and the electrolyte part to thereby achieve electric conductivity and ion conductivity, respectively.

The sheet for folding batteries obtained was folded along the intended fold lines L to produce a battery (metal-air battery) having a total of three cells connected in series. Each stack of the battery produced was evaluated.

FIG. 5A illustrates a total voltage of each stack, and FIG. 5B illustrates an average voltage per cell (total voltage/number of cells) in each stack. As illustrated in FIG. 5A, the voltage increased as the number of cells (the number of stacks) was increased, and the total voltage was 3.17 V in a case where the number of cells was three (three stacks). Further, as illustrated in FIG. 5B, even if the number of cells was increased, the voltage per cell was substantially constant. Also, as for the case where the number of cells was three (three stacks), the current was measured by connecting to a resistor of 680Ω, and it was confirmed that a current of 30 μA flows.

REFERENCE SIGNS LIST

1: Folding battery
10, 10A: Sheet for folding batteries
11: Sheet
11A: Electrode part sheet
11B: Electrolyte part sheet
11*a*, 11Aa, 11Ba: One surface
11*b*, 11Ab, 11Bb: Another surface
12, 22: Electrolyte part
12*a*, 22*a*: Electrolyte layer
13: Electrode part
13A: Positive electrode layer
13B: Negative electrode layer
14: Conductor
L: Intended fold line
M: Intended fold line for electrode part
N: Intended fold line for electrolyte part
H: Through hole

The invention claimed is:

1. A sheet for folding batteries comprising:

a sheet that has one surface and another surface, and has a plurality of intended fold lines parallel to each other set on the sheet;

at least one electrolyte part that is placed between a pair of the intended fold lines on the sheet; and a plurality of electrode parts that is placed, on the sheet, next to the electrolyte part with the intended fold line interposed therebetween, wherein the electrolyte part includes a through hole provided between the one surface and the other surface of the sheet, and an electrolyte layer that is formed on the one surface and the other surface of the sheet so as to face each other across the through hole and is integrated via the through hole.

2. The sheet for folding batteries according to claim 1, wherein the electrolyte part is staggered when the sheet is viewed in plan.

3. The sheet for folding batteries according to claim 1, wherein the electrode part includes a positive electrode layer provided on the one surface of the sheet, a negative electrode layer that is provided, on the other surface of the sheet, at a position facing the positive electrode layer across the sheet, and a conductor that penetrates the sheet to electrically connect the positive electrode layer and the negative electrode layer to each other.

4. The sheet for folding batteries according to claim 3, wherein the positive electrode layer is placed so as to come into contact with the electrolyte layer provided on the one surface side of the sheet in a case where the sheet is folded along the intended fold lines.

5. The sheet for folding batteries according to claim 3, wherein the negative electrode layer is placed so as to come into contact with the electrolyte layer provided on the other surface side of the sheet in a case where the sheet is folded along the intended fold lines.

6. The sheet for folding batteries according to claim 1, wherein the electrolyte layer is in a gel or solid form.

7. The sheet for folding batteries according to any one of claim 1, wherein the sheet is made of a hydrophobic sheet.

8. The sheet for folding batteries according to claim 1, wherein a separator is embedded in the through hole.

9. A folding battery comprising the sheet for folding batteries according to claim 1.

10. A method for producing the folding battery including the sheet for folding batteries according to claim 1, the method comprising:

setting a plurality of the intended fold lines parallel to each other on the sheet having the one surface and the other surface; and folding the sheet along the intended fold lines so that the electrode part and the electrolyte part adjacent to each other come into contact with each other.

11. The method for producing the folding battery according to claim 10, wherein the electrode part includes a positive electrode layer provided on the one surface of the sheet, a negative electrode layer that is provided, on the other surface of the sheet, at a position facing the positive electrode layer across the sheet, and a conductor that penetrates the sheet to electrically connect the positive electrode layer and the negative electrode layer to each other, and in a case where the sheet is folded along the intended fold lines, the sheet is folded in such a manner that the positive electrode layer comes into contact with the electrolyte layer on the one surface side of the sheet and the negative electrode layer comes into contact with the electrolyte layer on the other surface side of the sheet.

12. A sheet for folding batteries comprising:

an electrode part sheet that has one surface and another surface, and has a plurality of intended fold lines for electrode part set on the electrode part sheet, the plurality of intended fold lines for electrode part being parallel to each other;

an electrolyte part sheet that has one surface and another surface, and has a plurality of intended fold lines for electrolyte part set on the electrolyte part sheet, the plurality of intended fold lines for electrolyte part being parallel to each other;

a plurality of electrolyte parts that is placed, on the one surface of the electrolyte part sheet, on both sides of the intended fold line for electrolyte part; and a plurality of electrode parts that is placed, on the one surface and the other surface of the electrode part sheet, between the intended fold lines for electrode part, wherein the electrolyte part includes an electrolyte layer that is formed on the one surface of the electrolyte part sheet and integrated on the intended fold line for electrolyte part.

13. The sheet for folding batteries according to claim 12, wherein the electrode part includes, on both sides of the electrode part sheet, a plurality of positive electrode layers and a plurality of negative electrode layers that are provided in a grid pattern, and a conductor that penetrates the electrode part sheet to electrically connect the positive electrode layer and the negative electrode layer to each other, the plurality of positive electrode layers is placed along the intended fold lines for electrode part, the plurality of negative electrode layers is so placed as to be adjacent to a column of the plurality of positive electrode layers with the intended fold line for electrode part interposed therebetween, and the positive electrode layer and the negative electrode layer are so provided at positions facing each other across the electrode part sheet.

14. A folding battery comprising the sheet for folding batteries according to claim 12.

15. A method for producing the folding battery including the sheet for folding batteries according to claim 12, the method comprising:

overlapping the electrolyte part sheet on both surfaces of the electrode part sheet so that the electrode part and the electrolyte part come into contact with each other; and subsequently, folding each of the sheets along the intended fold lines for electrode part and the intended fold lines for electrolyte part in such a manner that the electrode parts adjacent to each other on the electrode part sheet face each other across the electrolyte part on the electrolyte part sheet.

* * * * *